United States Patent
Lemmens et al.

(10) Patent No.: US 7,011,193 B2
(45) Date of Patent: Mar. 14, 2006

(54) ROD GUIDE AND SEAL SYSTEM FOR GAS FILLED SHOCK ABSORBERS

(75) Inventors: Robby Lemmens, Wijchmaal/Prer (BE); Tom De Maesschalck, Blanden (BE); Dirk Verdeyen, St. Truide (BE); Peter Boon, Yimburgen (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/779,592

(22) Filed: Feb. 13, 2004

(65) Prior Publication Data
US 2005/0178627 A1   Aug. 18, 2005

(51) Int. Cl.
*F16F 9/36* (2006.01)
(52) U.S. Cl. ............................................ 188/322.17
(58) Field of Classification Search ............... 188/284, 188/288, 322.16, 322.17; 92/165 R, 168; 277/371, 375
See application file for complete search history.

(56) References Cited

U.S. PATENT DOCUMENTS

| | | | |
|---|---|---|---|
| RE29,497 E | 12/1977 | Freitag | |
| 4,230,309 A * | 10/1980 | Schnitzius | 188/284 |
| 4,360,192 A | 11/1982 | Ishida | 188/322.17 |
| 4,519,481 A | 5/1985 | Nicholls | |
| 4,537,422 A | 8/1985 | O'Rourke | |
| 4,548,389 A * | 10/1985 | Smith et al. | 188/322.16 |
| 4,552,344 A | 11/1985 | Johnson | |
| 4,560,177 A | 12/1985 | Riley, Jr. | |
| 4,921,223 A | 5/1990 | Fukumura et al. | |
| 4,944,498 A | 7/1990 | Kortgen et al. | 267/64.11 |
| 5,011,121 A | 4/1991 | Oriola et al. | 267/64.11 |
| 5,507,505 A | 4/1996 | Von-Arndt et al. | |
| 5,664,651 A | 9/1997 | Miura et al. | |
| 5,735,371 A * | 4/1998 | Jobelius et al. | 188/322.17 |
| 5,984,060 A | 11/1999 | Clark et al. | |
| 6,318,526 B1 | 11/2001 | Kruckemeyer et al. | |
| 6,382,373 B1 * | 5/2002 | Lemmens et al. | 188/322.17 |
| 6,390,258 B1 | 5/2002 | Hofmann et al. | |
| 6,510,930 B1 | 1/2003 | Kime | |
| 6,511,056 B1 | 1/2003 | Barandiaran Salaberria | |

FOREIGN PATENT DOCUMENTS

JP   01169139 A  *  7/1989

* cited by examiner

*Primary Examiner*—Thomas Williams
(74) *Attorney, Agent, or Firm*—Harness, Dickey & Pierce, PLC

(57) ABSTRACT

A gas shock absorber has a pressure tube which defines a working chamber. A piston assembly divides the working chamber into an upper working chamber and a lower working chamber. A plurality of extension passages extend through the piston assembly and are opened and closed by an extension valve assembly. A plurality of compression passages extend through the piston assembly and are opened and closed by a compression valve assembly. A rod guide assembly is located between the pressure tube and the piston rod. The rod guide assembly includes an oil chamber for sealing and lubricating the piston rod. An axially movable piston maintains the pressure within the oil chamber equal to the pressure in the upper working chamber.

24 Claims, 6 Drawing Sheets

ROD GUIDE AND SEAL SYSTEM FOR GAS FILLED SHOCK ABSORBERS

FIELD OF THE INVENTION

The present invention relates generally to dampers and shock absorbers adapted for use in a suspension system such as the suspension system used for automotive vehicles. More particularly, the present invention relates to a rod guide assembly for a shock absorber which utilizes a gas rather than a hydraulic liquid as the damping medium.

BACKGROUND OF THE INVENTION

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is normally attached to the unsprung portion of the vehicle. The piston is normally attached to the sprung portion of the vehicle through a piston rod which extends through the pressure tube. The piston divides the pressure tube into an upper working chamber and a lower working chamber both of which are typically filled with a hydraulic liquid. Because the piston is able, through valving, to limit the flow of the hydraulic liquid between the upper and the lower working chambers when the shock absorber is compressed or extended, the shock absorber is able to produce a damping force which counteracts the vibration which would otherwise be transmitted from the unsprung portion of the vehicle to the sprung portion of the vehicle. In a dual tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the vehicle.

Shock absorbers filled with a hydraulic liquid have met with continuous success throughout the automotive industry. While meeting with success in the automotive industry, hydraulic liquid filled shock absorbers are not without their problems. One problem with these prior art shock absorbers is the difficulty to make them sensitive to the frequency of the vibrations. Complex systems have been developed to produce hydraulic liquid filled shock absorbers which are relatively soft for high frequency vibrations while being relatively stiff for low frequency vibrations. Other problems associated with the prior art hydraulic liquid filled shock absorbers include the variability in their damping forces due to the temperature changes of the hydraulic liquid. As the temperature of the hydraulic liquid changes, the viscosity of the liquid also changes which significantly affects the damping force characteristics of the liquid. In addition, any aeration of the hydraulic liquid during operation adversely affects the operation of the damper due to the introduction of a compressible gas into a non-compressible hydraulic liquid. Finally, the hydraulic liquid adds to the weight of the shock absorber as well as presenting environmental concerns regarding the use of a hydraulic liquid.

In order to overcome some of the problems with shock absorbers which utilize hydraulic liquid as the damping medium, shock absorbers have been developed which utilize a gas such as air as the damping medium. The use of a gas as the damping medium produces a frequency dependent damper which is less sensitive to temperature changes when compared to hydraulic liquid dampers, it is not adversely affected by aeration over time, it is lower in weight and it is environmental friendly due to the elimination of the hydraulic liquid.

While gas filled shock absorbers have addressed some of the problems associated with hydraulic liquid dampers, they are not without their own unique problems. One area that presents problems for the gas filled shock absorbers is the sealing system incorporated into the rod guide assembly which seals and lubricates the piston rod. In most prior art gas springs or gas filled shock absorbers, the sealing system incorporated into the rod guide assembly consists of two seals with an oil chamber positioned between them. The oil provides lubrication for the seals and it forms an extra barrier to the gas molecules in order to guarantee a perfect sealing. A problem with this prior art design is that the pressure in the oil chamber can increase over time. The pressure is at atmospheric pressure when the shock absorber is manufactured and it increases up to the static pressure of the working chamber or even worse, up to the highest dynamic pressure occurring in the working chamber over time. Such a pressure raise causes an increase in the amount of seal friction and thus the accelerated wear of the seals. The cause of this increase in pressure is the migration of gas molecules through the seal from the high pressure side (working chamber) to the low pressure side (oil chamber).

The continued development of gas filled shock absorbers has been the development of improved sealing system for the rod guide assembly which address the above described issues.

SUMMARY OF THE INVENTION

The present invention provides the art with an improved sealing system for a rod guide assembly. The sealing system includes a pair of seals with an oil chamber located between them. The lower seal is located on a movable piston. The movable piston moves axially within the working chamber in order to balance the pressure between the oil chamber and the working chamber of the shock absorber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
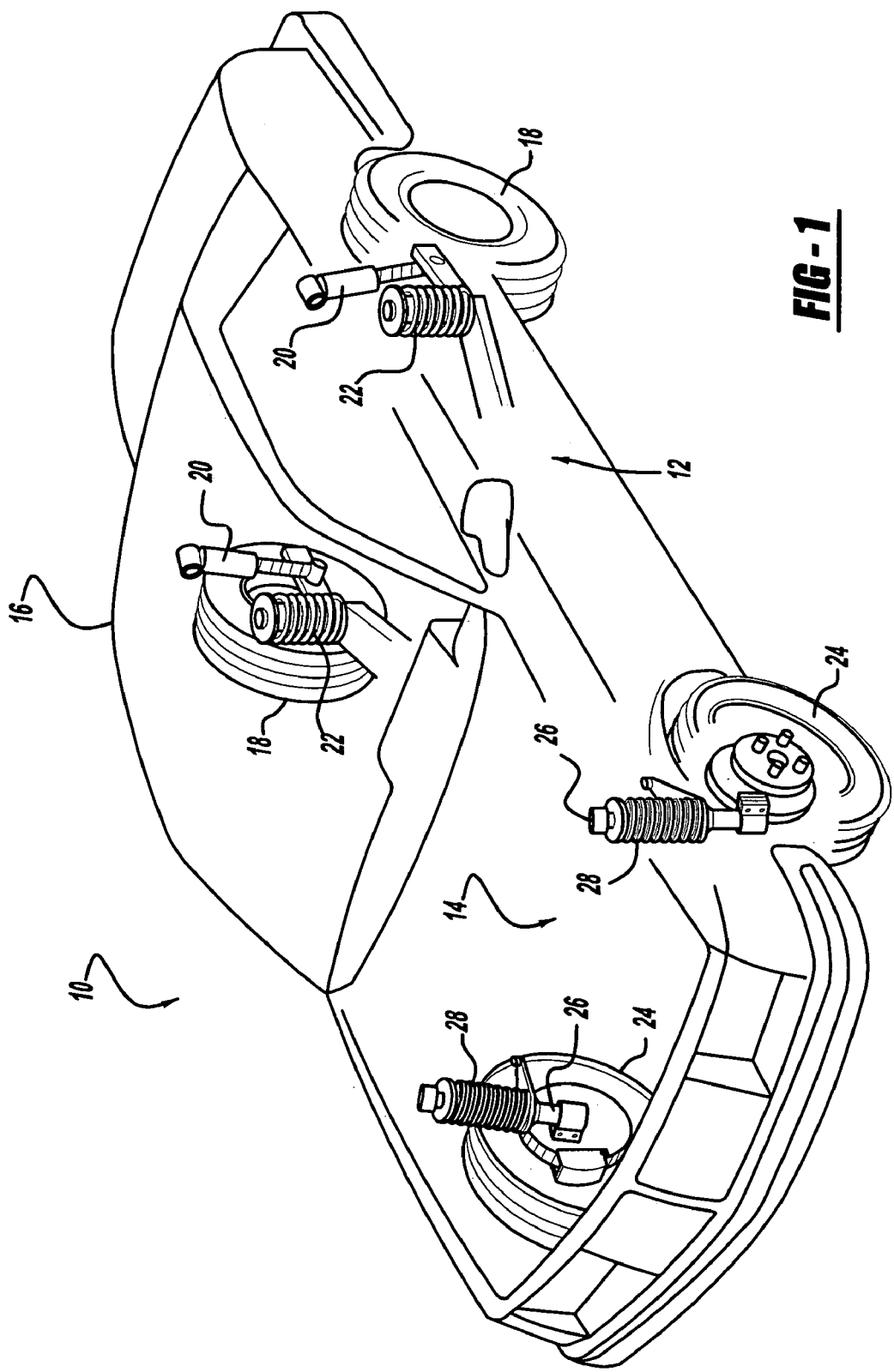
FIG. 1 is an illustration of an automobile incorporating a gas filled shock absorber which includes the sealing system according to the present invention.

Referring now to the drawings in which like reference numerals designate like or corresponding parts throughout the several views, there is shown in FIG. 1 a vehicle incorporating a suspension system having the frequency dependant dampers in accordance with the present invention which is designated generally by the reference numeral 10. Vehicle 10 includes a rear suspension system 12, a front suspension system 14 and a body 16. Rear suspension system 12 includes a pair of independent suspensions adapted to operatively support a pair of rear wheels 18. Each rear independent suspension is attached to body 16 by means of a shock absorber 20 and a helical coil spring 22. Similarly, front suspension 14 includes a pair of independent suspensions adapted to operatively support a pair of front wheels 24. Each independent front suspension is attached to body 16 by means of a shock absorber 26 and a helical coil spring 28. Rear shock absorbers 20 and front shock absorbers 26 serve to dampen the relative movement of the unsprung portion of vehicle 10 (i.e., front and rear suspension systems 12 and 14 respectively) with respect to the sprung portion (i.e., body 16) of vehicle 10. While vehicle 10 has been depicted as a passenger vehicle having independent front and rear suspensions, shock absorbers 20 and 26 may be used with other types of vehicles having other types of suspensions and springs or in other types of applications including, but not limited to, vehicles incorporating air springs, leaf springs, non-independent front and/or non-independent rear suspension systems. One of the unique features of the present invention is that if it is combined with an air spring, the air spring and the shock absorber can be separate units or the units can communicate with each other. There is no need to provide communication between the air spring and the shock absorber but it is an option that may provide some advantages. Further, the term "shock absorber" as used herein is meant to refer to dampers in general and thus will include MacPherson struts, spring seat units as well as other shock absorber designs known in the art.

Figure 2:
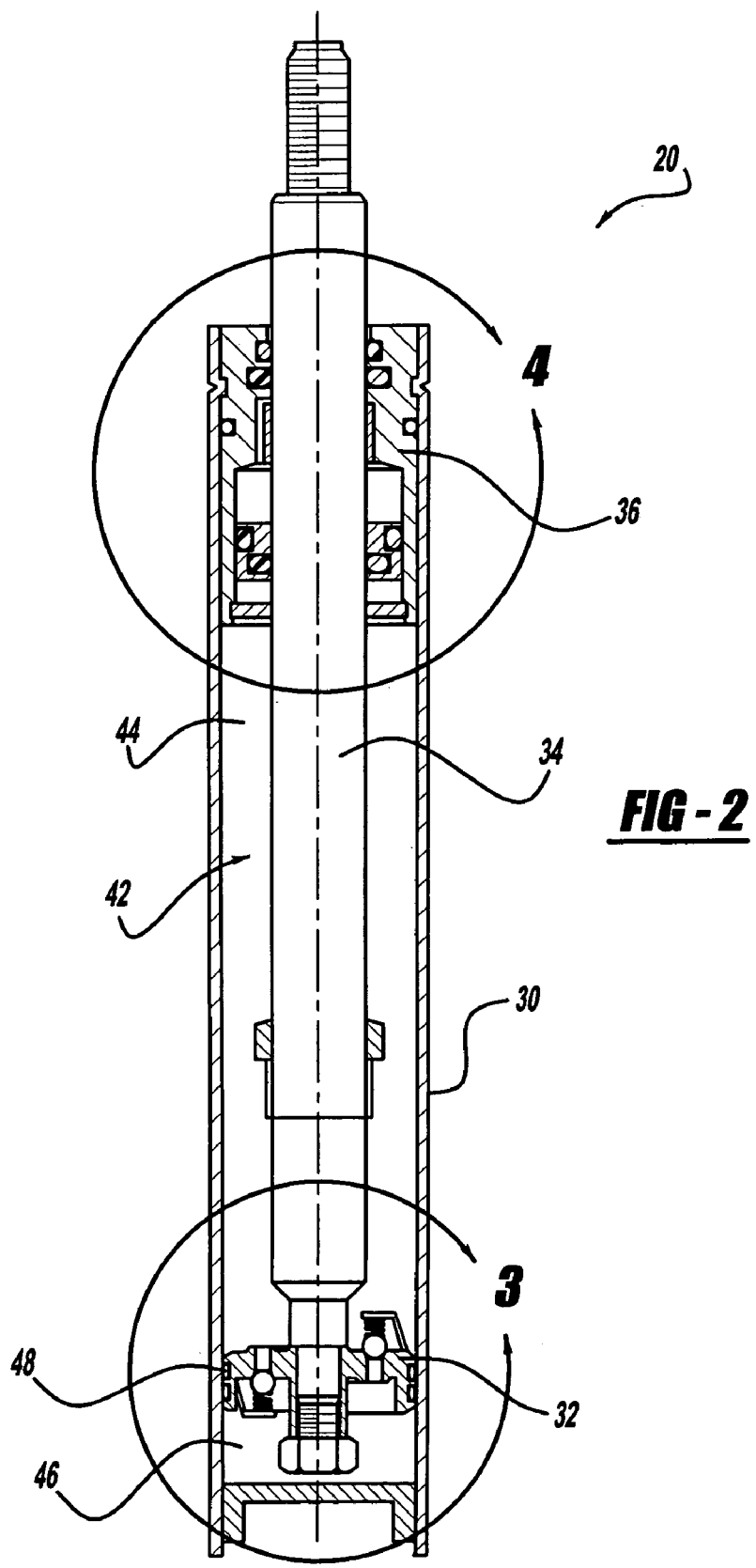
FIG. 2 is a side view, partially in cross-section, of the shock absorber illustrated in FIG. 1 which incorporates the sealing system in accordance with the present invention.

Referring to FIG. 2, rear shock absorber 20 is shown in greater detail. While FIG. 2 shows only rear shock absorber 20, it is to be understood that front shock absorber 26 could also be designed as a frequency dependent damper having the rod guide assembly in accordance with the present invention. Front shock absorber 26 would only differ from rear shock absorber 20 in the way it is adapted to be connected to the sprung and unsprung portions of vehicle 10 and in the dimensions of the various components. Shock absorber 20 comprises a pressure tube 30, a piston assembly 32, a piston rod 34 and a rod guide assembly 36.

Pressure tube 30 defines a working chamber 42. Working chamber 42 is filled with a gas, preferably air, at a specified pressure to act as the damping medium. Piston assembly 32 is slidably disposed within working chamber 42 and divides working chamber 42 into an upper working chamber 44 and a lower working chamber 46. A seal assembly 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through rod guide assembly 36 which closes the upper end of pressure tube 30. The end of piston rod 34 opposite to piston assembly 32 is adapted to be secured to the sprung portion of vehicle 10. The end of pressure tube 30 opposite to rod guide assembly 36 is adapted to be connected to the unsprung portion of vehicle 10. While piston rod 34 is shown adapted for being connected to the sprung portion of vehicle 10 and pressure tube 30 is adapted for being connected to the unsprung portion of vehicle 10, due to the use of a gas as the damping medium, it is within the scope of the present invention to have piston rod 34 adapted to attach to the unsprung portion of vehicle 10 and pressure tube 30 adapted to attach to the sprung portion of vehicle 10 if desired.

Figure 3:
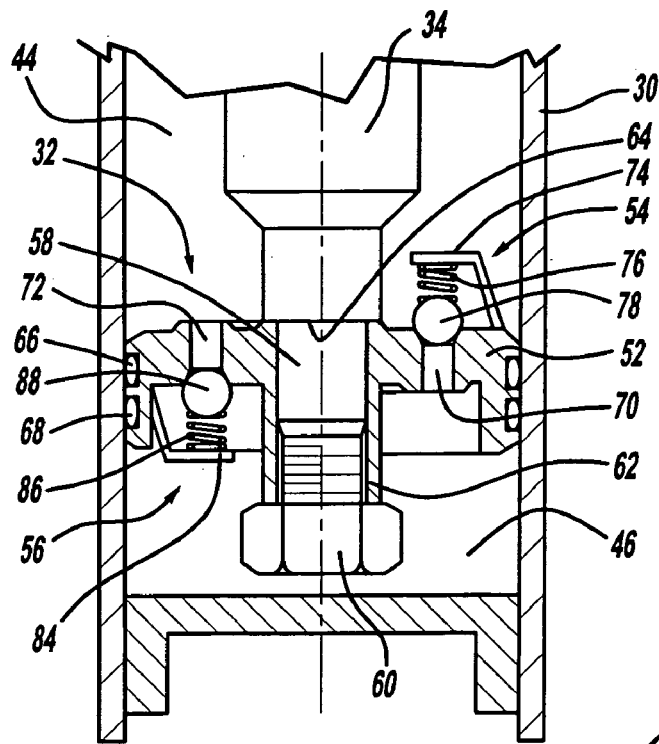
FIG. 3 is an enlarged schematic cross-sectional view of the piston valving system illustrated in FIG. 2.

Referring now to FIGS. 2 and 3, piston assembly 32 comprises a piston body 52, a compression valve assembly 54 and a rebound valve assembly 56. Piston rod 34 defines a reduced diameter section 58 onto which piston assembly 32 is located. A nut 60 and a washer 62 secure piston assembly 32 onto section 58 of piston rod 34 with piston assembly 32 abutting a shoulder 64 located on piston rod 34.

Seal assembly 48 comprises a first annular seal 66 located between piston body 52 and pressure tube 30 at a position near upper working chamber 44 and a second annular seal 68 located between piston body 52 at a position near lower working chamber 46. While seal assembly 48 is being illustrated as a multi-piece component, it is within the scope of the present invention to manufacture seal assembly 48 as a single piece component if desired. Seal assembly 48 permits sliding motion of piston body 52 with respect to pressure tube 30 without generating undue frictional forces as well as providing a seal between upper working chamber 44 and lower working chamber 46. This dual role played by seal assembly 48 is extremely important for the gas shock absorber due to the high pressures generated in working chambers 44 and 46 with the continued need for limiting the sliding forces generated between piston assembly 32 and pressure tube 30.

Piston body 52 defines a plurality of compression passages 70 and a plurality of extension passages 72. During a compression movement of shock absorber 20, gas flows from lower working chamber 46 to upper working chamber 44 through compression passages 70 as described below. During an extension movement of shock absorber 20, gas flows from upper working chamber 44 to lower working chamber 46 through extension passages 72 as described below.

Compression valve assembly 54 comprises a plurality of retainers 74, a plurality of valve springs 76 and a plurality of valve members 78. Each valve member 78 is biased against piston body 52 by a respective valve spring 76 which reacts against a respective valve retainer 74 to normally close a respective one of the plurality of compression passages 70. During a compression stroke of shock absorber 20, the gas in lower working chamber 46 is compressed including the gas within the plurality of compression passages 70. The compressed gas in compression passages 70 exerts a force on valve members 78 which will remain seated closing compression passages 70 until the force created by the gas pressure overcomes the biasing load of valve springs 76 unseating valve members 78 from piston body 52 allowing gas to flow from lower working chamber 46 to upper working chamber 44 through compression passages 70. While valve members 78 are illustrated schematically as balls, any valve member including valve discs or other devices that function to open and close passages 70 can be used.

Rebound valve assembly 56 comprises a plurality of retainers 84, a plurality of valve springs 86 and a plurality of valve members 88. Each valve member 88 is biased against piston body 52 by a respective valve spring 86 which reacts against a respective valve retainer 84 to normally close a respective one of the plurality of extension passages 72. During an extension stroke of shock absorber 20, the gas in upper working chamber 44 is compressed including the gas within the plurality of extension passages 72. The compressed gas in extension passages 72 exerts a force on valve members 88 which will remain seated closing extension passages 72 until the force created by the gas pressure overcomes the biasing load of valve springs 86 unseating valve members 88 from piston body 52 allowing gas to flow from upper working chamber 44 to lower working chamber 46 through extension passages 72. While valve members 88 are illustrated schematically as balls, any valve member including valve discs or other devices which function to open and close passages 70 can be used.

Figure 4:
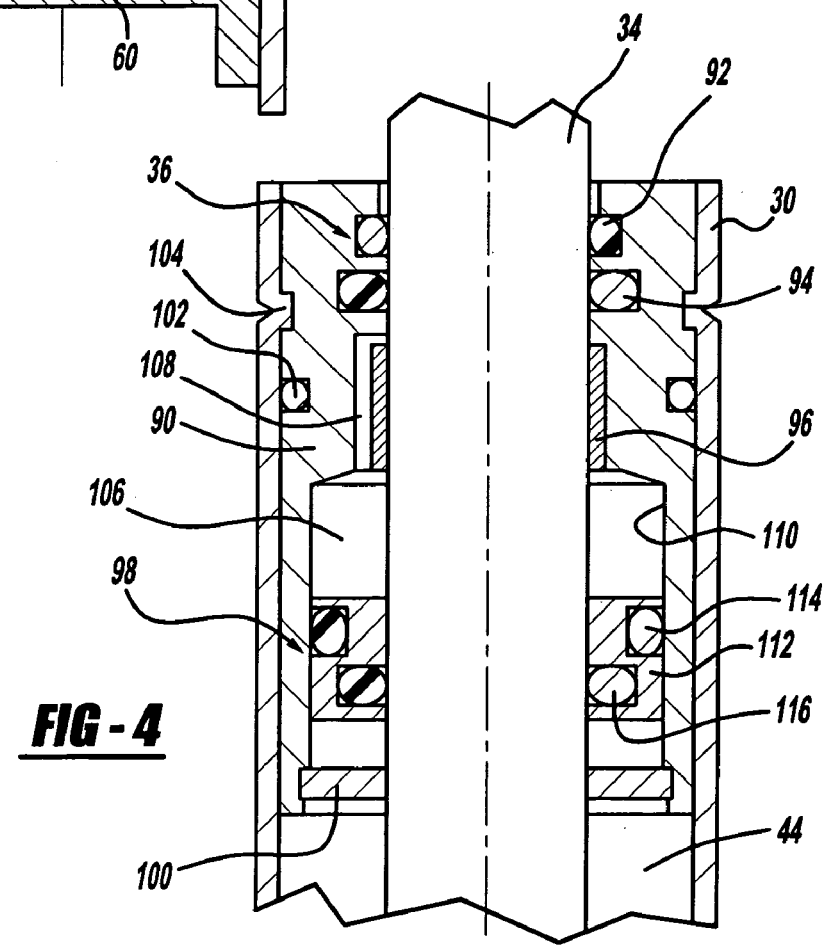
FIG. 4 is an enlarged cross-sectional view of the rod guide assembly illustrated in FIG. 2 and which incorporates the sealing system in accordance with the present invention.

Referring now to FIGS. 2 and 4, rod guide assembly 36 provides both a sealing function for shock absorber 20 as well as a lubricating function. Rod guide assembly 36 comprises a main housing 90, a dust wiper 92, an upper seal 94, a bearing 96, a piston assembly 98 and a retainer 100. Main housing 90 is fit within pressure tube 30 with a seal 102 sealing the interface between main housing 90 and pressure tube 30. Seal 102 prevents gas from escaping from upper working chamber 44 between main housing 90 and pressure tube 30. A formed section 104 of pressure tube 30 is compressed into a groove defined by main housing 90 to retain main housing 90 within pressure tube 30.

Dust wiper 92 is an optional component which is disposed between main housing 90 and piston rod 34. Dust wiper 92 prevents dirt from entering rod guide assembly 36. Upper seal 94 is disposed below dust wiper 92 and between main housing 90 and piston rod 34. Upper seal 94 seals an oil chamber 106 from the environment surrounding shock absorber 20. Oil chamber 106 is disposed between upper seal 94 and piston assembly 98. Bearing 96 is disposed below upper seal 94 and between main housing 90 and piston rod 34. Bearing 96 provides the guiding for the movement of piston rod 34. A lubrication channel 108 extends between oil chamber 106 and upper seal 94 to provide lubrication for upper seal 94.

Piston assembly 98 is slidably disposed within a bore 110 defined by main housing 90. Piston assembly 98 is movable between the upper end of bore 110 and retainer 100 to vary the volume of oil chamber 106. Retainer 100 is attached to main housing 90 at the end of bore 110 to act as a stop for piston assembly 98. Piston assembly 98 comprises a piston body 112, an O-ring 114 and a lower seal 116. O-ring 114 is disposed between piston body 112 and main housing 90 to seal oil chamber 106 from upper working chamber 44. Lower seal 116 is disposed between piston body 112 and piston rod 34 to also seal oil chamber 106 from upper working chamber 44.

Piston assembly 98 can slide axially within main housing 90 in order to balance the gas pressure in upper working chamber 44 with the oil pressure within oil chamber 106. With this construction, pressures in upper working chamber 44 and in oil chamber 106 will always be equal. Retainer 100 provides a stop to limit the extension movement of piston assembly 32 and the travel of piston assembly 98.

Figure 5:
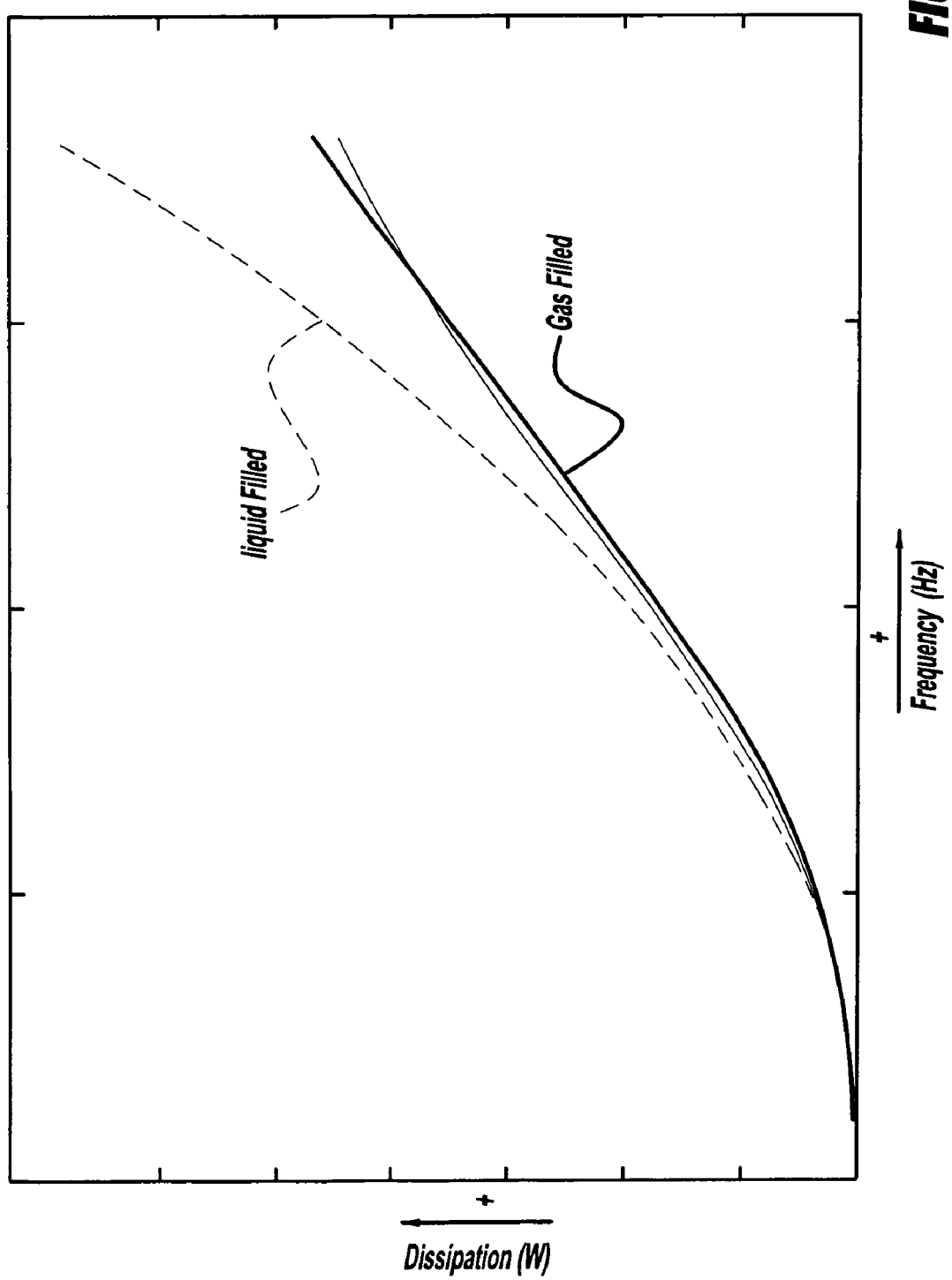
FIG. 5 is a graph illustrating frequency versus dissipation for both a liquid filled prior art shock absorber and the gas filled shock absorber according to the present invention.

Gas filled shock absorber 20 described above provides a frequency dependant damper which can be tuned to specific performance requirements for specific applications. During compression and extension movements of a prior art liquid filled shock absorber, the liquid moves from either the lower working chamber to the upper working chamber or the upper working chamber to the lower working chamber. This provides frequency vs. dissipation response curves which continue to rise at an ever increasing rate as the frequency of the damped vibration increases leading to an exponential shape curve at higher frequencies. The present invention provides the suspension system designer the opportunity to flatten the shape of this curve as shown in FIG. 5.

The flattening out of this curve is due to the compressibility of a gas versus the non-compressibility of a liquid. During low speed or low frequency movements of shock absorber 20, minimal compression of the gas occurs and movement of piston assembly 32 transfers gas between lower and upper working chambers 44, 46 of pressure tube 30. As the frequency of the movement increases, compression of the gas will also increase changing the dissipation as the compressed gas begins to work like a gas spring. The specific point at which the gas shock curve bends away from the liquid shock curve can be tuned by selecting different sizes for passages 70 and 72. In addition to changing the shape of the curve as shown in FIG. 5, the height of the curve can be tuned by changing the initial pressure within working chamber 42.

The dual points of tunability for shock absorber 20 allows for tuning shock absorber 20 to both the body natural frequency and the wheel suspension natural frequency to optimize performance of shock absorber 20 at both of these frequencies. The prior art liquid shock absorbers could be tuned to a specific frequency response but the remaining frequency responses were a result of the shape of the curve which could not be altered.

Figure 6:
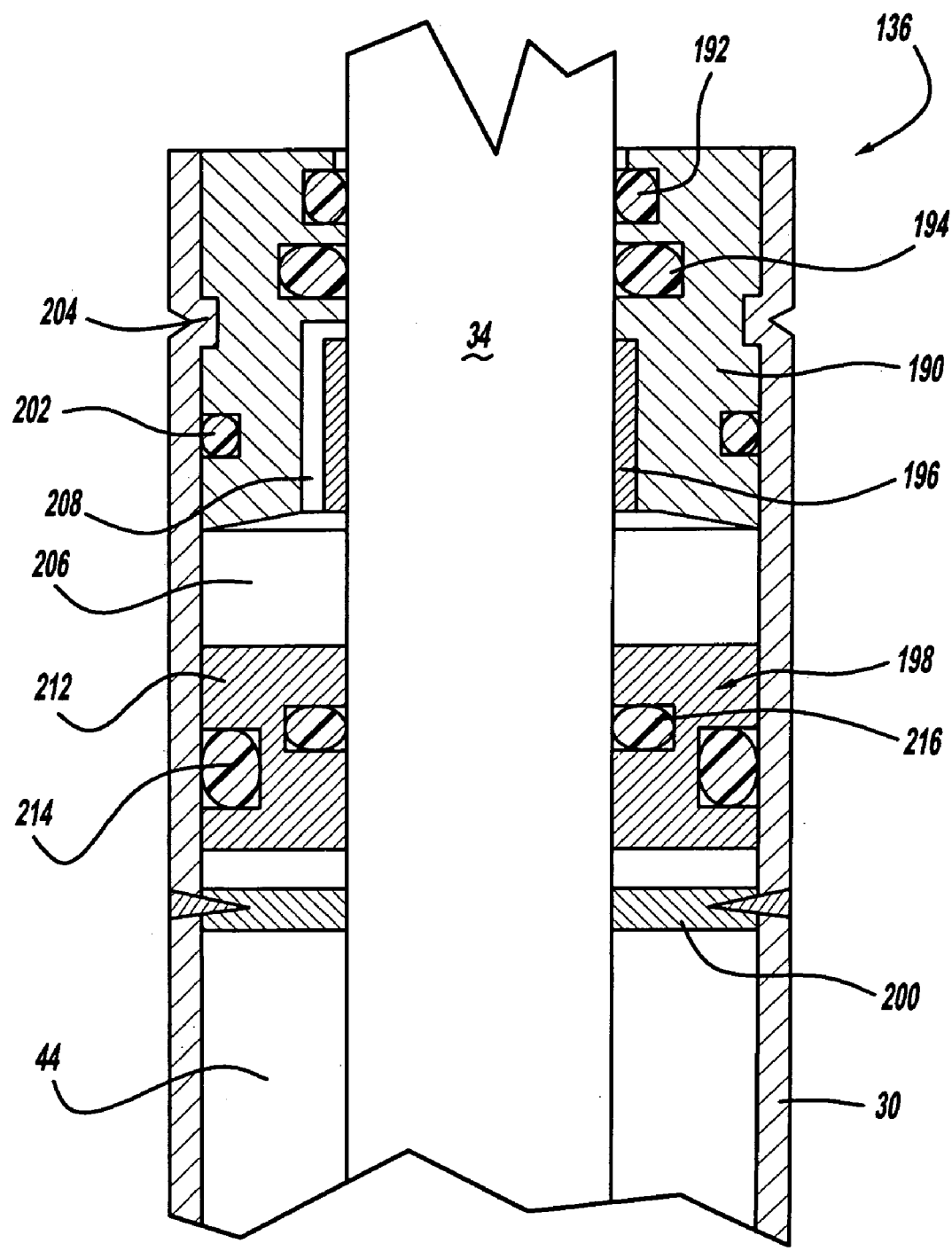
FIG. 6 is an enlarged cross-sectional view of a rod guide assembly in accordance with another embodiment of the present invention; and, FIG. 7 is an enlarged cross-sectional view of a rod guide assembly in accordance with another embodiment of the present invention.

Referring now to FIG. 6, a rod guide assembly 136 in accordance with another embodiment of the invention is illustrated. Rod guide assembly 136 is a direct replacement for rod guide assembly 36.

Rod guide assembly 136 provides both a sealing function for shock absorber 20 as well as a lubricating function. Rod guide assembly 136 comprises a main housing 190, a dust wiper 192, an upper seal 194, a bearing 196, a piston assembly 198 and a retainer 200. Main housing 190 is fit within pressure tube 30 with a seal 202 sealing the interface between main housing 190 and pressure tube 30. Seal 202 prevents gas from escaping from upper working chamber 44 between main housing 190 and pressure tube 30. A formed section 204 of pressure tube 30 is compressed into a groove defined by main housing 190 to retain main housing 190 within pressure tube 30.

Dust wiper 192 is an optional component which is disposed between main housing 190 and piston rod 34. Dust wiper 192 prevents dirt from entering rod guide assembly 136. Upper seal 194 is disposed below dust wiper 192 and between main housing 190 and piston rod 34. Upper seal 194 seals an oil chamber 206 from the environment surrounding shock absorber 20. Oil chamber 206 is disposed between upper seal 194 and piston assembly 198. Bearing 196 is disposed below upper seal 194 and between main housing 190 and piston rod 34. Bearing 196 provides the guiding for the movement of piston rod 34. A lubrication channel 208 extends between oil chamber 206 and upper seal 194 to provide lubrication for upper seal 194.

Piston assembly 198 is slidably disposed within pressure tube 30. Piston assembly 198 is movable between the lower end of main housing 190 and retainer 200 to vary the volume of oil chamber 206. Retainer 200 is attached to pressure tube 30 by welding or other means known in the art to act as a stop for piston assembly 198. Piston assembly 198 comprises a piston body 212, an O-ring 214 and a lower seal 216. O-ring 214 is disposed between piston body 212 and pressure tube 30 to seal oil chamber 206 from upper working chamber 44. Lower seal 216 is disposed between piston body 212 and piston rod 34 to also seal oil chamber 206 from upper working chamber 44.

Piston assembly 198 can slide axially within pressure tube 30 in order to balance the gas pressure in upper working chamber 44 with the oil pressure within oil chamber 206. With this construction, pressures in upper working chamber 44 and in oil chamber 206 will always be equal. Retainer 200 provides a stop to limit the extension movement of piston assembly 32 and the travel of piston assembly 198.

Figure 7:
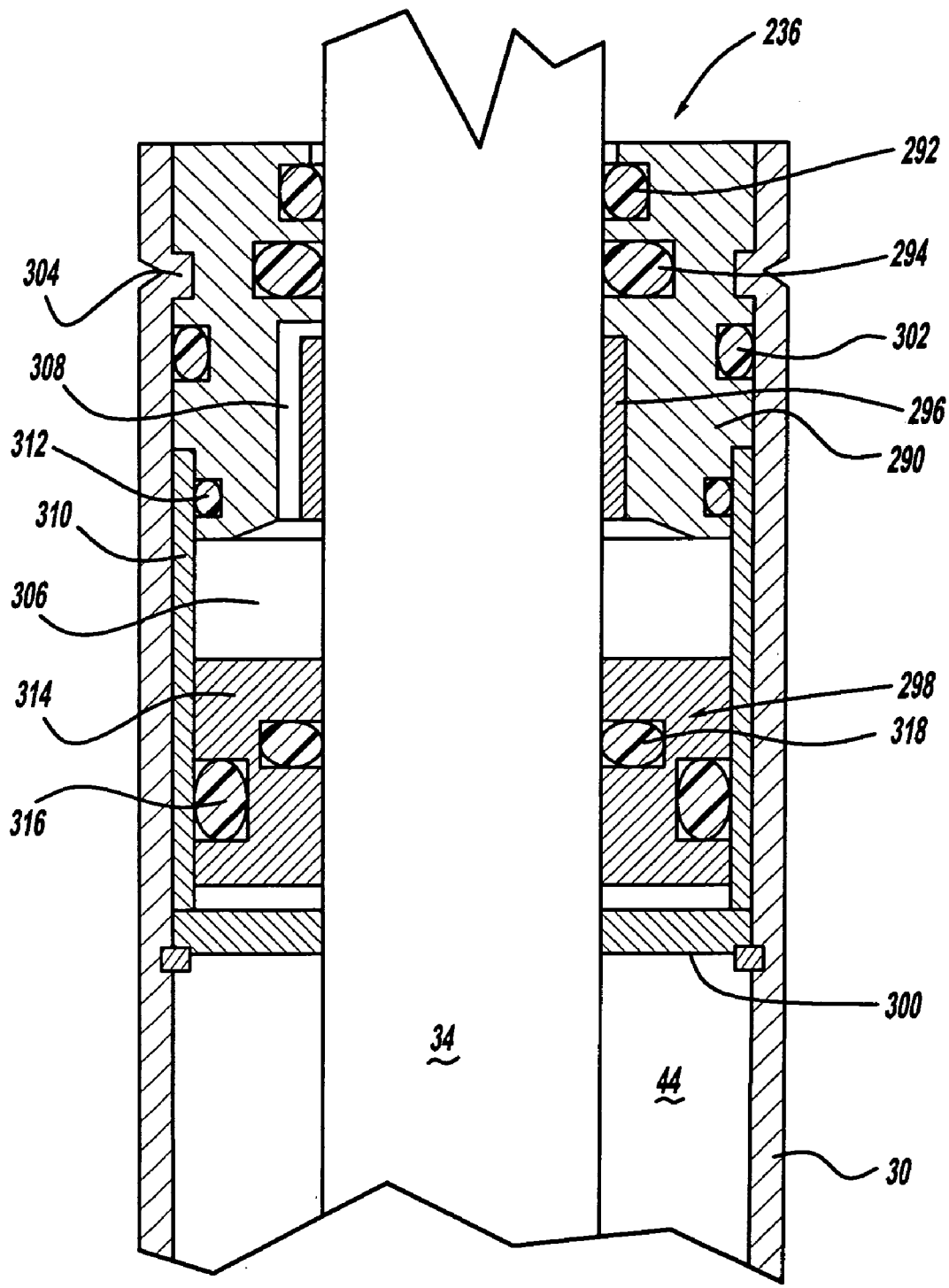

Referring now to FIG. 7, a rod guide assembly 236 in accordance with another embodiment of the present invention is illustrated. Rod guide assembly 236 is a direct replacement for rod guide assembly 36 or 136.

Rod guide assembly 236 provides both a sealing function for shock absorber 20 as well as a lubricating function. Rod guide assembly 236 comprises a main housing 290, a dust wiper 292, an upper seal 294, a bearing 296, a piston assembly 298 and a retainer 300. Main housing 290 is fit within pressure tube 30 with a seal 302 sealing the interface between main housing 290 and pressure tube 30. Seal 302 prevents gas from escaping from upper working chamber 44 between main housing 290 and pressure tube 30. A formed section 304 of pressure tube 30 is compressed into a groove defined by main housing 290 to retain main housing 290 within pressure tube 30.

Dust wiper 292 is an optional component which is disposed between main housing 290 and piston rod 34. Dust wiper 292 prevents dirt from entering rod guide assembly 236. Upper seal 294 is disposed below dust wiper 292 and between main housing 290 and piston rod 34. Upper seal 294 seals an oil chamber 306 from the environment surrounding shock absorber 20. Oil chamber 306 is disposed between upper seal 294 and piston assembly 298. Bearing 296 is disposed below upper seal 294 and between main housing 290 and piston rod 34. Bearing 296 provides the guiding for the movement of piston rod 34. A lubrication channel 308 extends between oil chamber 306 and upper seal 294 to provide lubrication for upper seal 294.

Piston assembly 298 is slidably disposed within a sleeve 310 which abuts to main housing 290. A seal 312 is disposed between sleeve 310 and main housing 290 to seal oil chamber 306. Piston assembly 298 is movable between the lower end of main housing 290 and retainer 300. Retainer 300 abuts sleeve 310 and it is attached to pressure tube 30 a snap ring, by welding or by other means known in the art to act as a stop for piston assembly 198.

Piston assembly 298 comprises a piston body 314, an O-ring 316 and a lower seal 318. O-ring 316 is disposed between piston body 314 and sleeve 310 to seal oil chamber 306 from upper working chamber 44. Lower seal 318 is disposed between piston body 314 and piston rod 34 to also seal oil chamber 306 from upper working chamber 44.

Piston assembly 298 can slide axially within sleeve 310 in order to balance the gas pressure in upper working chamber 44 with the oil pressure within oil chamber 306. With this construction, pressures in upper working chamber 44 and in oil chamber 306 will always be equal. Retainer 300 provides a stop to limit the extension movement of piston assembly 32 and the travel of piston assembly 298.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A damper comprising:
    a pressure tube defining a longitudinal axis and forming a working chamber;
    a damper piston disposed within said working chamber, said damper piston dividing said working chamber into an upper working chamber and a lower working chamber;
    a piston rod attached to said damper piston and extending through said pressure tube;
    a rod guide assembly disposed between said piston rod and said pressure tube; said rod guide assembly comprising:
    a main housing for guiding the movement of said piston rod;
    an annular bearing disposed between said main housing and said piston rod, said annular bearing slidingly engaging said piston rod;
    a first seal disposed between a first component of said rod guide assembly and said piston rod, said first seal being disposed on a first side of said bearing;
    a second seal disposed between a second component of said rod guide assembly and said piston rod said second seal being disposed on a second side of said bearing opposite said first side;
    a fluid chamber disposed between said first and second seal;
    a lubrication channel extending from said fluid chamber around and outside diameter of said bearing to one of said first and second seals;
    a guide piston movable with respect to said fluid chamber to vary the volume of said fluid chamber.

2. The damper according to claim 1 wherein said first component is said main housing.

3. The damper according to claim 2 wherein said second component is said guide piston.

4. The damper according to claim 1 wherein said second component is said guide piston.

5. The damper according to claim 1 wherein said guide piston slidingly engages said main housing.

6. The damper according to claim 5 wherein said first component is said main housing.

7. The damper according to claim 6 wherein said second component is said guide piston.

8. The damper according to claim 5 wherein said second component is said guide piston.

9. The damper according to claim 1 wherein said guide piston slidingly engages said pressure tube.

10. The damper according to claim 9 wherein said first component is said main housing.

11. The damper according to claim 10 wherein said second component is said guide piston.

12. The damper according to claim 9 wherein said second component is said guide piston.

13. A damper comprising:
- a pressure tube defining a longitudinal axis and forming a working chamber;
- a damper piston disposed within said working chamber, said damper piston dividing said working chamber into an upper working chamber and a lower working chamber;
- a piston rod attached to said damper piston and extending through said pressure tube;
- a rod guide assembly disposed between said piston rod and said pressure tube; said rod guide assembly comprising:
- a main housing;
- an annular bearing disposed between said main housing and said piston rod;
- a first seal disposed between a first component of said rod guide assembly and said piston rod, said first seal being disposed on a first side of said bearing;
- a second seal disposed between a second component of said rod guide assembly and said piston rod said second seal being disposed on a second side of said bearing opposite said first side;
- a fluid chamber disposed between said first and second seal;
- a lubrication channel extending from said fluid chamber around said bearing to one of said first and second seals;
- a guide piston movable with respect to said fluid chamber to vary the volume of said fluid chamber; wherein said guide piston slidingly engages a sleeve disposed between said pressure tube and said guide piston.

14. The damper according to claim 13 wherein said first component is said main housing.

15. The damper according to claim 14 wherein said second component is said guide piston.

16. The damper according to claim 13 wherein said second component is said guide piston.

17. The damper according to claim 13 wherein said sleeve is attached to said main housing.

18. The damper according to claim 13 wherein said rod guide assembly further comprises a retainer disposed between said guide piston and said damper piston, said retainer providing a stop for said guide piston.

19. The damper according to claim 18 wherein said retainer provides a stop for said damper piston.

20. The damper according to claim 18 wherein said retainer abuts said sleeve.

21. The damper according to claim 1 wherein said rod guide assembly further comprises a retainer disposed between said guide piston and said damper piston, said retainer providing a stop for said guide piston.

22. The damper according to claim 21 wherein said retainer is attached to said main housing.

23. The damper according to claim 21 wherein said retainer is attached to said pressure tube.

24. The damper according to claim 1 further comprising a dust wiper disposed between said rod guide assembly and said piston rod.

* * * * *